(12) United States Patent
Heravi et al.

(10) Patent No.: US 7,316,304 B2
(45) Date of Patent: Jan. 8, 2008

(54) FOUR-WHEEL DRIVE CENTER DISCONNECT ELECTRIC ACTUATOR

(75) Inventors: Oliver Heravi, Tigard, OR (US);
Ernest Ozsvath, Salem, OR (US);
Scott Stocker, Vancouver, WA (US);
Kip E. Clohessy, Milwaukie, OR (US);
Bryan M. Averill, Portland, OR (US)

(73) Assignee: Warn Industries, Inc., Milwaukie, OR (US)

( * ) Notice: Subject to any disclaimer, the term of this patent is extended or adjusted under 35 U.S.C. 154(b) by 270 days.

(21) Appl. No.: 11/150,575

(22) Filed: Jun. 10, 2005

(65) Prior Publication Data

US 2006/0278490 A1    Dec. 14, 2006

(51) Int. Cl.
*B60K 17/02* (2006.01)
*F16D 28/00* (2006.01)

(52) U.S. Cl. ............... 192/20; 192/84.6; 192/84.7; 180/248

(58) Field of Classification Search .................. None
See application file for complete search history.

(56) References Cited

U.S. PATENT DOCUMENTS

| 2,754,692 | A | * | 7/1956 | Russell .................. 74/473.21 |
| 3,132,531 | A | * | 5/1964 | Boughner .................. 74/335 |
| 4,428,248 | A | * | 1/1984 | Broucksou et al. ........... 74/335 |
| 4,550,625 | A | * | 11/1985 | Martin et al. .................. 74/335 |
| 5,150,637 | A | * | 9/1992 | Ninomiya et al. ............ 74/335 |
| 5,180,959 | A | * | 1/1993 | Christopher ................ 318/626 |
| 5,267,635 | A | | 12/1993 | Peterson et al. |
| 5,605,213 | A | | 2/1997 | White |
| 5,788,008 | A | | 8/1998 | Fort et al. |
| 2002/0134182 | A1 | * | 9/2002 | Schleuder et al. ............ 74/339 |

* cited by examiner

*Primary Examiner*—Richard M Lorence
(74) *Attorney, Agent, or Firm*—Harness, Dickey & Pierce, P.L.C.

(57) ABSTRACT

A four-wheel drive center disconnect electric actuator is provided. The actuator includes a one-way motor that actuates a cam mechanism for causing engagement and disengagement of the center disconnect. The actuator achieves improved reliability and efficiency through a less expensive construction than conventional actuators.

26 Claims, 6 Drawing Sheets

FOUR-WHEEL DRIVE CENTER DISCONNECT ELECTRIC ACTUATOR

FIELD OF THE INVENTION

The present invention relates to drive lines for four-wheel drive vehicles, and more particularly, to a drive line disconnect actuator with reduced cost and improved reliability.

BACKGROUND AND SUMMARY OF THE INVENTION

Four-wheel drive vehicles are popular for use off road and for providing improved traction on snowy, icy, and other slippery roads. Four-wheel drive vehicles are often provided with the capability of disconnecting the secondary driving axle in order to provide a two-wheel drive mode when using four-wheel drive mode is not beneficial. However, even in the two-wheel drive mode, many of the drive components are driven by rotation of the wheels which are in engagement with the road. Accordingly, wheel end disconnects and center disconnects have been developed in order to disconnect either the wheels or the axles from the remaining driveline system so that all of the components of the driveline are not rotated by rotation of the non-driven wheels of a four-wheel drive vehicle. It has been found that disconnection of the driveline components from the non-driven wheels can significantly reduce the amount of torque demand for driving the vehicle as well as increasing the fuel efficiency of the vehicle when operated in the two-wheel drive mode. Although suitable disconnect mechanisms have been developed for use with four-wheel drive vehicles, it is still desirable to provide a more reliable and less expensive driveline disconnect system.

Conventional driveline disconnects utilize actuators that include a threaded lead screw which is engaged by a nut follower for providing connection of the driveline disconnect. When these conventional systems are shifted into the four-wheel drive (connect) position, the force exerted by the axle return spring and/or actuator block shift spring to the actuator nut follower is transmitted back to the actuator gear train. These forces, along with vehicle vibration over long periods of time, can potentially backdrive/creep the nut follower so as to negatively impact the operation of the conventional actuator device. In addition, conventional actuators require the use of a bi-directional motor for moving the driveline disconnect between the connected and disconnected positions. The bi-directional motion in these conventional actuators applies excessive stress on the motor, shafts, gears, and supporting joints, especially during a rapid shift cycle. Hence, these excessive stresses deteriorate the actuator's life and performance. Additional components and electrical circuitry are required that contribute to added cost and complexity. The travel of a nut follower, in conventional actuators, is also constrained by a mechanical stop. This mechanical stop creates a potential for the actuator to be jammed. Furthermore, in the conventional actuator, the motor needs to develop a high torque level at the beginning of a shift that applies undesirable stresses on the motor and other actuator components.

The disconnect actuator of the present invention provides the force and stroke required by a coupling member to engage and disengage a coupler for providing connection between a first and second rotatable member. A one-way electric motor is utilized and is operable to drive a gear mechanism and associated cam mechanism. A cam follower is engaged with the cam mechanism and is supported for linear motion relative to the cam mechanism and is engageable with the coupler device for moving the coupler to one of an engaged and disengaged position. The cam mechanism and cam follower are arranged such that rotation of the cam mechanism in 180 degree increments provides connection and subsequent disconnection of the coupler device while utilizing the one-way motor. The driveline disconnect actuator of the present invention utilizes a relay switch (for example, a single pole double-throw) with a stationary encoder and a rotating wiper that provides a relatively simple low cost switching circuit as compared to the costly electronic circuitry typically required for conventional actuators using bi-directional motor control.

Furthermore, the system of the present invention is immune to the backdrive phenomenon associated with conventional actuators in that the rotation of the worm/cam from 0 to 180 degrees transfers into linear displacement of the cam follower to cause a shift from a two-wheel drive operating mode to a four-wheel drive operating mode. The rotation of the worm gear from 180 degrees to 360 degrees transfers into linear displacement of the cam follower to cause a shift from the four-wheel drive mode to a two-wheel drive mode. Therefore, either at the 0 or the 180 degree position of the cam, the exerted forces are transmitted to the worm gear, supporting pin, and the housing and do not contribute to a backdrive phenomenon as experienced with conventional actuators.

The use of a one-way motor also improves the disconnect actuator's performance and reduces the cost. Because the motor and gear train rotate in one direction only, it reduces the stress on the motor, shaft, gears, and supporting joints. The bi-directional motion in conventional actuators applies excessive stress on the motor, shafts, gears, and supporting joints.

The driveline disconnect actuator of the present invention also eliminates the problem of jamming, since the use of a 180 degree rotating cam mechanism does not utilize a mechanical stop, there is no potential for jamming. Finally, since the actuator linear displacement of the present invention is the sine function of a one gear angular rotation, and since the motor's peak torque is at 90 degree rotation of the worm gear, the motor starts up with ease since at start-up, minimum torque is required. At the start of any shift, the present invention allows the motor to accelerate to high speed before approaching a peak torque. However, in conventional actuators, the motor needs to develop a higher torque immediately at a beginning of a shift. Furthermore, the worm gear drive of the present invention is less noisy than a conventional planetary gear system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
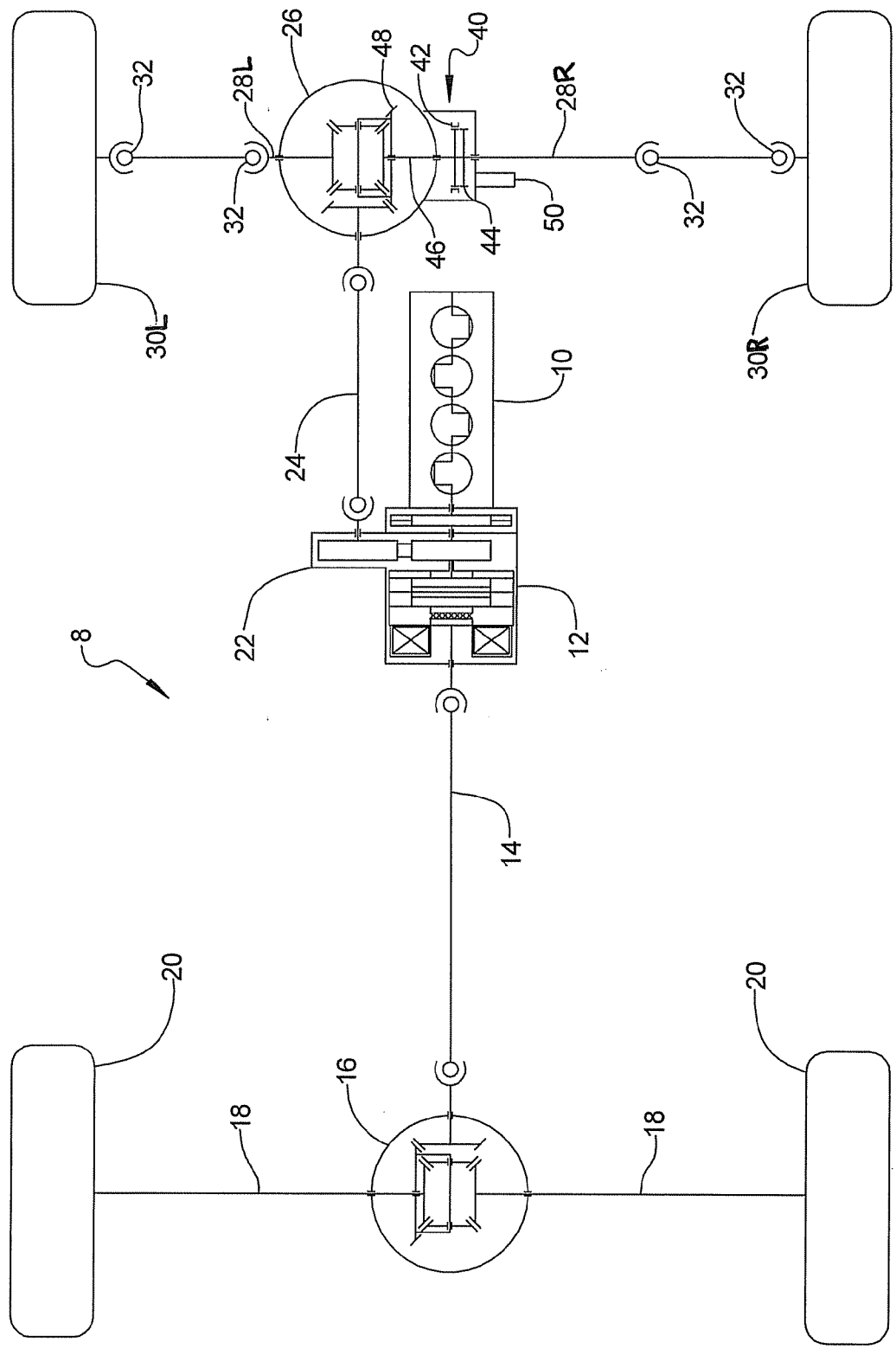
FIG. 1 is a schematic diagram of a vehicle driveline incorporating a center disconnect electric actuator, according to the principles of the present invention.

With reference to FIG. 1, an exemplary vehicle driveline 8 for a four-wheel drive vehicle incorporating a center disconnect electric actuator, according to the principles of the present invention, will now be described. The rotative power of the vehicle engine 10 is transmitted to the rear wheels 20 by the transmission 12 rotating the propeller shaft 14 which is coupled to the rear differential 16. Axle shafts 18 extending from the differential 16 rotate the rear wheels 20. The rotative power of the engine 10 is transmitted to the front wheels 30 by a transfer case 22 (coupled to the transmission 12) that selectively rotates the front propeller shaft 24 coupled to the front differential 26. Axles 28L, 28R extending from the front differential 26 rotate the front wheels 30L, 30R, respectively. As is known in the art, the transfer case 22 has a shift mechanism to selectively provide rotative power to the front propeller shaft 24 or not to provide rotative power. Thus, the vehicle may be operated in two-wheel drive or four-wheel drive mode depending on the shift selection of the transfer case 22.

The front wheels 30L, 30R of the vehicle are steerable and the vehicle is provided with steering knuckles, generally known in the art. The front axles 28L, 28R extend from the front differential and are provided with universal joints 32 to accommodate the steering capability. The center disconnect device 40 is provided between one of the axle shafts 28R and the differential 26. The center disconnect 40 includes a shift fork 42 and a coupler sleeve 44 which is operable to provide an engaged position and a disengaged position relative to the axle shaft 28R and the differential output shaft 46. The center disconnect 40 allows the axle shaft 28R to be disconnected from the differential 26 so that in the two-wheel drive operating mode, the rotation of the wheels 30L, 30R in contact with the road and the associated rotation of the axle shafts 28L, 28R can be isolated from other driveline components such as the front propeller shaft 24 and differential ring gear 48. An actuator device 50 is mounted to the housing of the center disconnect 40 for providing actuation of the center disconnect 40 between the engaged and disengaged positions.

Figure 2:
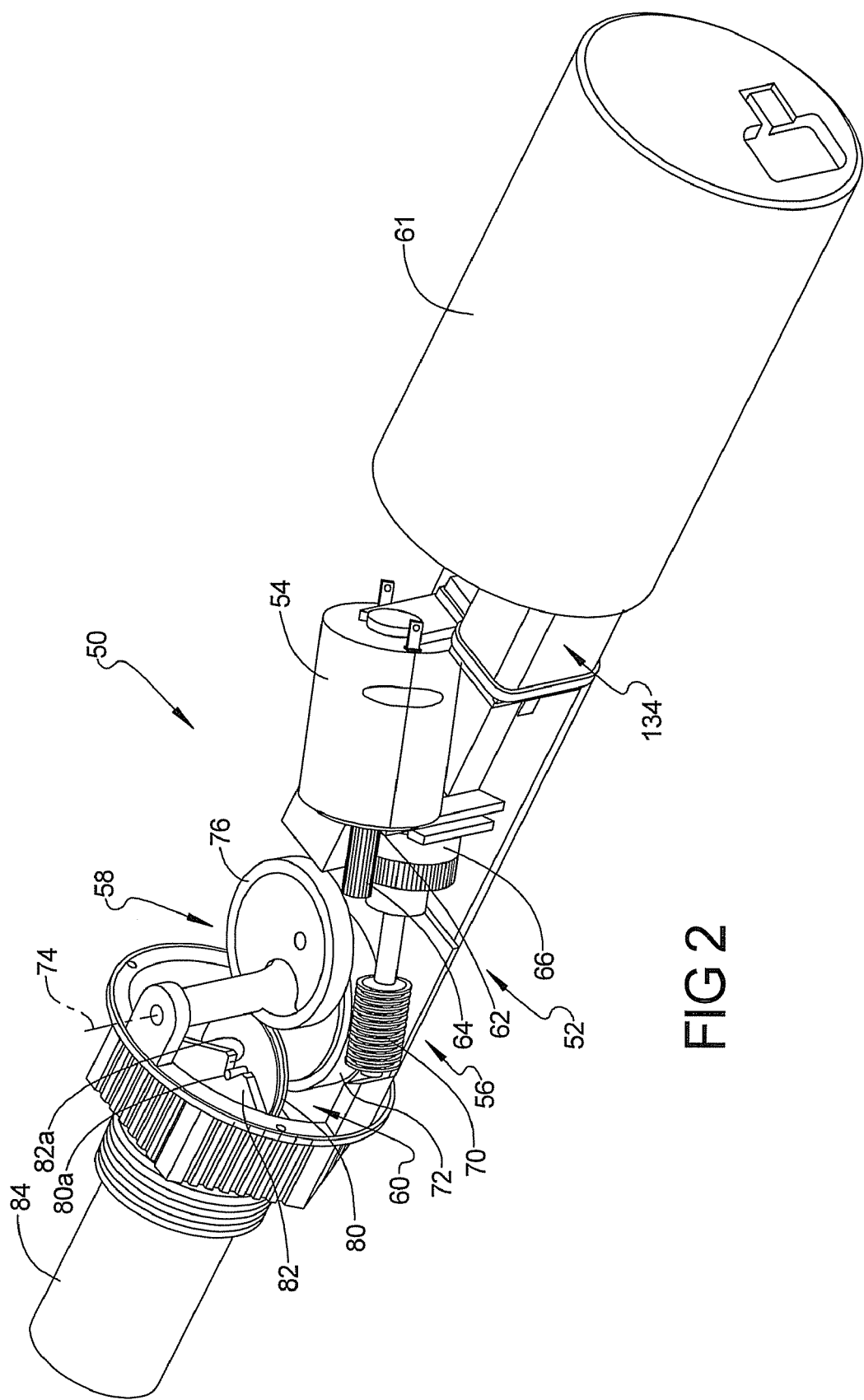
FIG. 2 is a perspective view of the disconnect actuator, according to the principles of the present invention.
Figure 3:
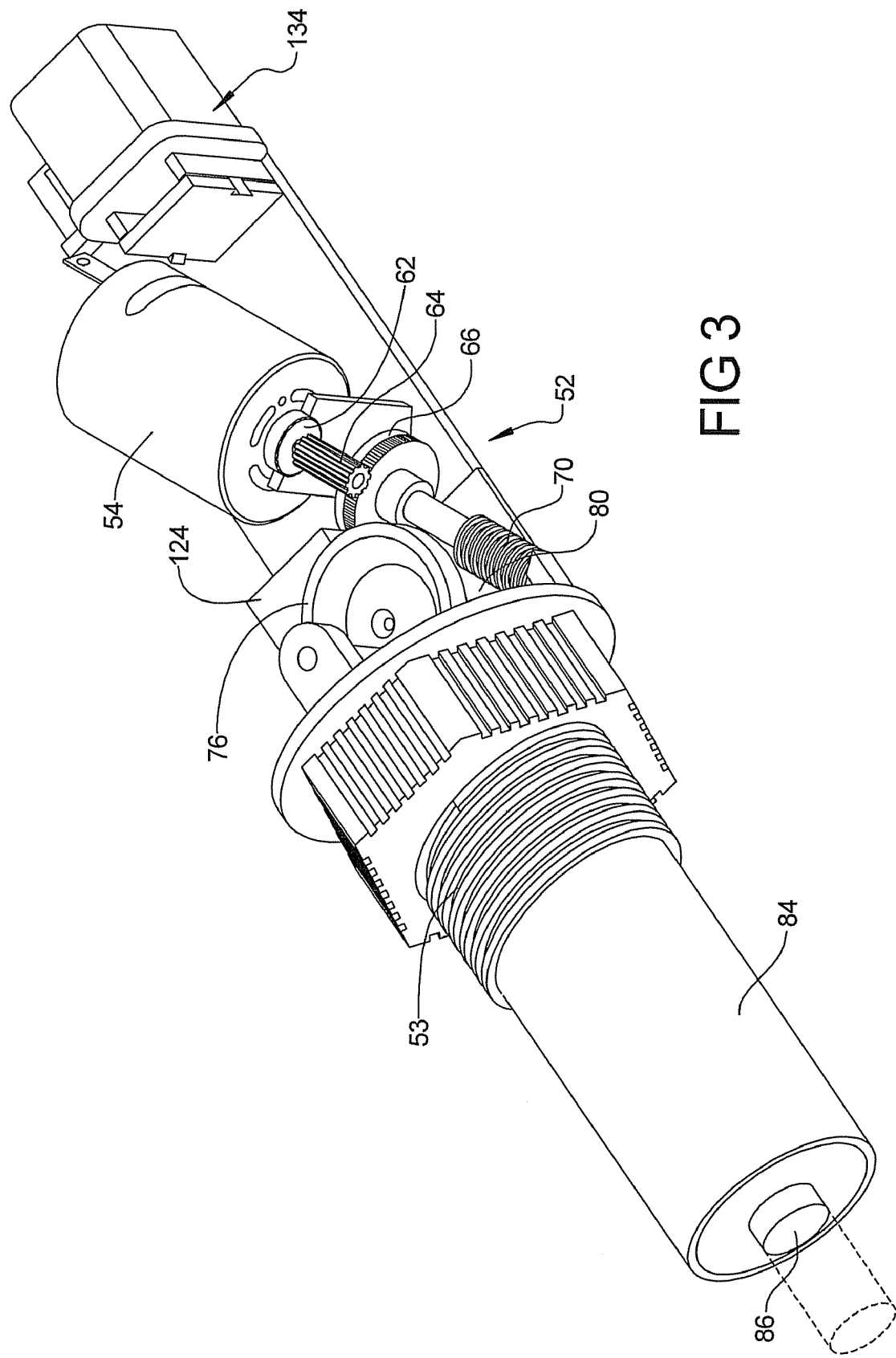
FIG. 3 is a perspective view from a different angle of the center disconnect actuator, according to the principles of the present invention.
Figure 4:
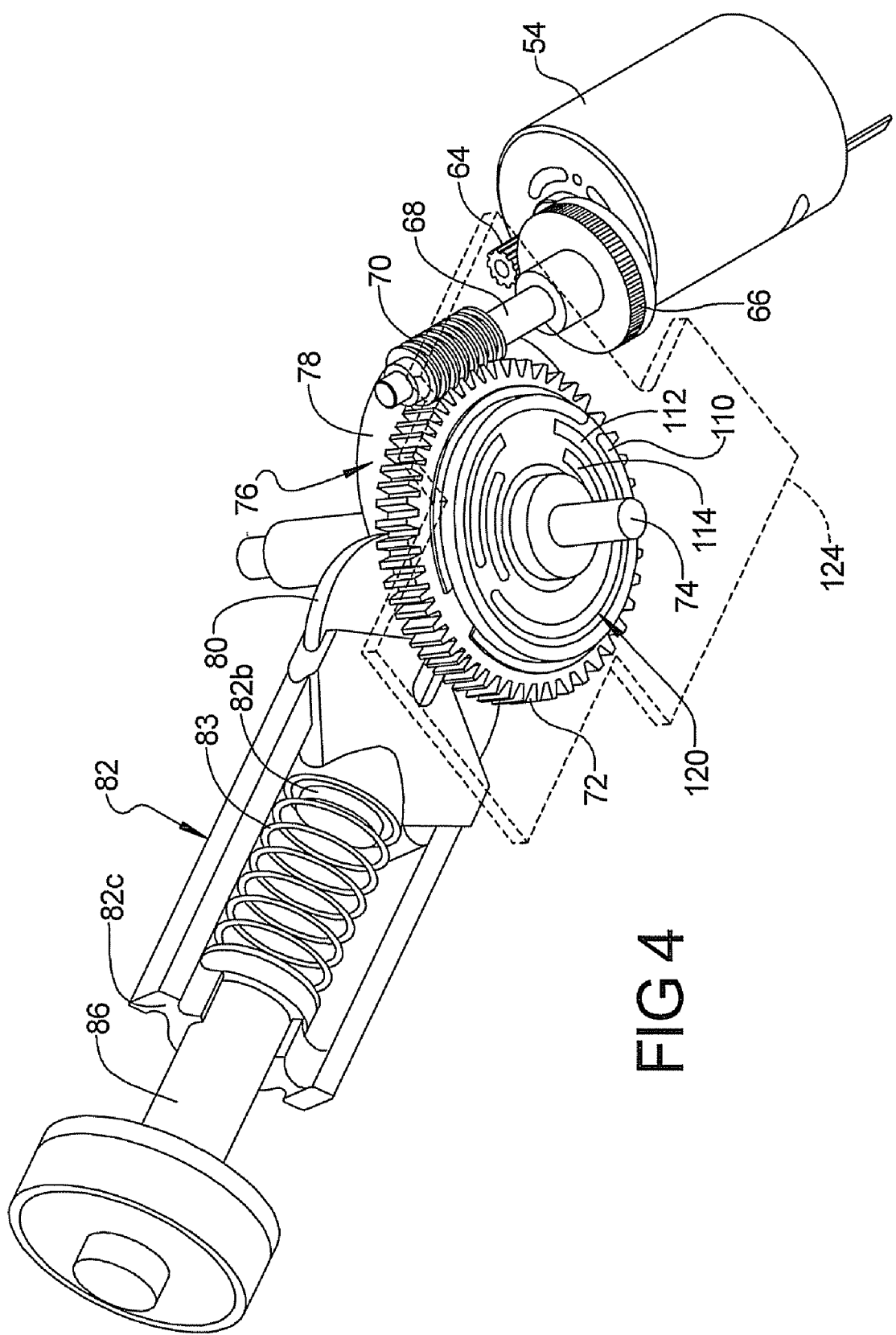
FIG. 4 is a bottom perspective view of the disconnect actuator, with the housing removed to better illustrate the components thereof.

With reference to FIGS. 2-4, the driveline disconnect actuator, according to the principles of the present invention, will now be described. The driveline disconnect actuator 50 includes a housing 52 which is connected to the housing of the disconnect mechanism 40 by threaded interface 53. A motor 54 is drivingly engaged with a gear mechanism 56 which is drivingly engaged with an eccentric cam mechanism 58 which in turn engages a cam follower mechanism 60. A cover 61 mounts to the housing 52.

The motor 54 includes an output spindle 62 having a drive gear 64 mounted thereon. Drive gear 64 is meshingly engaged with a driven gear 66 which is larger in diameter and includes more teeth than the drive gear 64. The motor and gear mounting are provided in an angled orientation on the housing 52 in order to conserve space. Driven gear 66 is mounted to, and rotatable with, an intermediate shaft 68 that includes a worm 70 fixedly mounted thereto. Worm 70 meshingly engages a worm gear 72 which is rotatably mounted to the housing 52 about an axis 74. An eccentric cam member 76 is fixedly mounted to the worm gear 72 and rotatable about axis 74. Eccentric cam 76 includes an outer surface 78 which engages a cam follower 80. The cam follower 80 is engaged with a linkage 82 which is slidably received in a forward portion 84 of housing 52. As best shown in FIG. 2, the linkage 82 includes a slot portion 82a which slidably receives a spindle 80a on the cam follower 80. The linkage 82 further includes a spring boss portion 82b which receives an end of a spring 83 that engages a plunger 86 at a second end thereof. As seen in FIG. 4, the plunger 86 is slidably received in the second end 82c of the linkage 82. The spring 83 allows the linkage 82 to be moved along with the cam follower 80 even when the plunger 86 is unable to move due the coupler sleeve 44 being misaligned. Once the coupler sleeve 44 is aligned for engagement, the spring 83 applies a biasing force to engage the coupler sleeve 44.

Upon rotation of the motor 54, the drive gear 64 drives driven gear 66 which causes rotation of worm 70 to drive worm gear 72 for causing eccentric cam member 76 to rotate about axis 74. As eccentric cam 76 rotates, engagement between the cam 76 and cam follower 80 causes linear movement of the cam follower 80 and linkage 82 which, in turn, causes plunger 86 (connected to the linkage 82) to extend from the forward housing portion 84 as illustrated in FIG. 3. The plunger 86 engages the shift fork 42 of the center disconnect device 40 in order to cause engagement of the center disconnect. The shift fork 42 is normally spring biased to a disengaged position so that when the plunger 86 is retracted, the shift fork 42 and coupler device 44 are automatically moved out of the engaged position.

It should be understood that the gear mechanism 56 provides a gear reduction between the motor 54 and cam mechanism 58, and that other alternative gear mechanisms could be utilized for providing the same or different gear reduction function as required by a specific application. Furthermore, the cam mechanism and cam follower, as illustrated, generally disclose a circular cam eccentrically rotatable about an axis 74, while other shapes of cam mechanisms could also be utilized without departing from the spirit and scope of the present invention.

Figure 5:
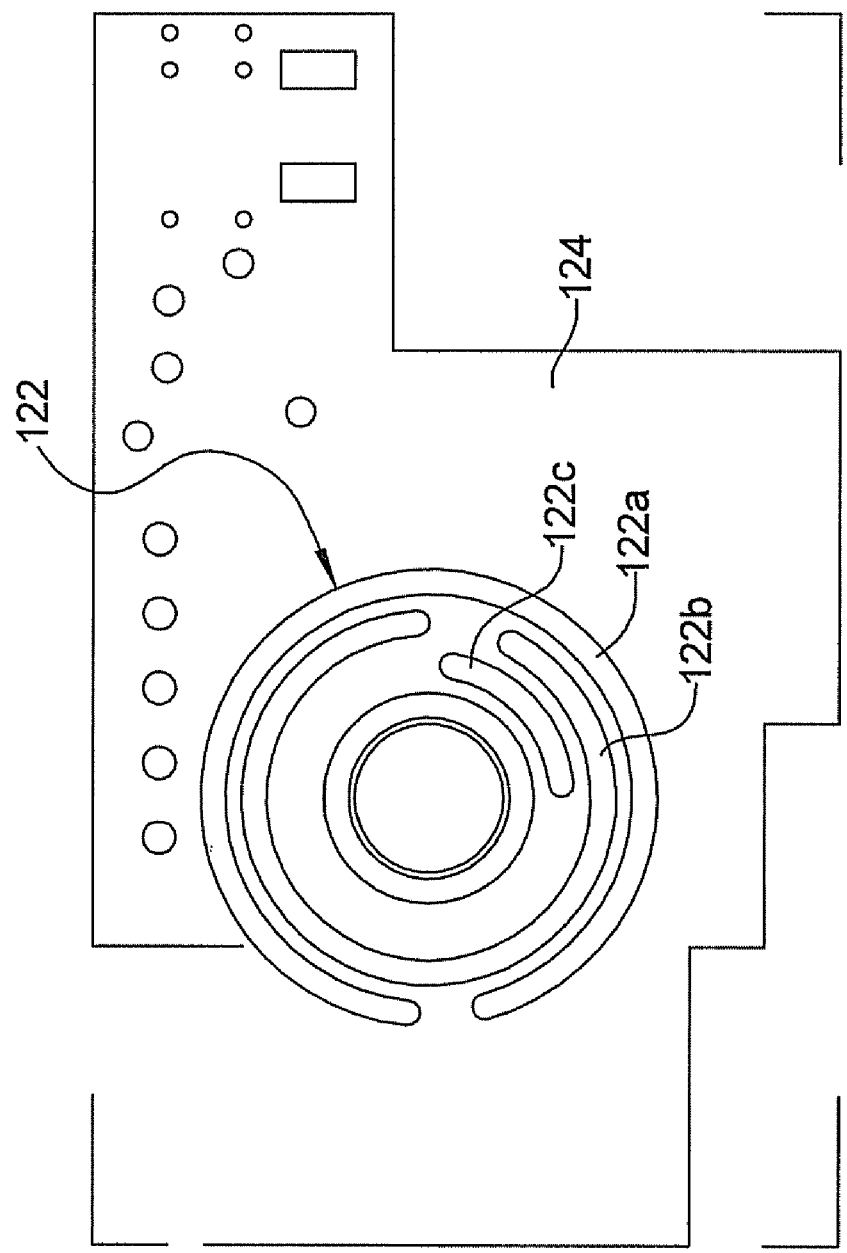
FIG. 5 is a schematic plan view of the printed circuit board of the present invention showing the trace pattern of the encoder/wiper utilized in the controller according to the principles of the present invention.
Figure 6:
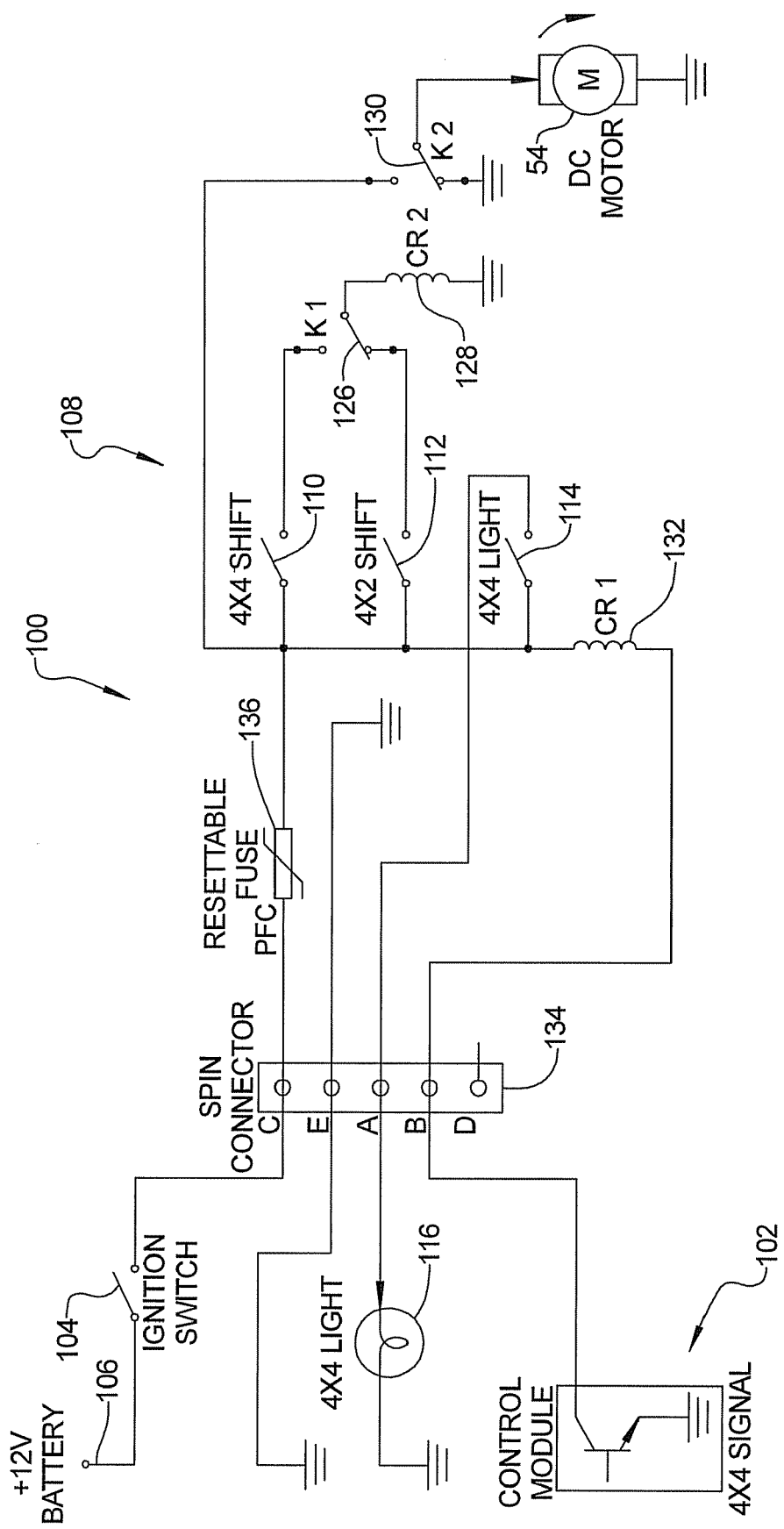
FIG. 6 is a schematic diagram of an electric control circuit according to the principles of the present invention.

With reference to FIG. 6, driveline disconnect actuator includes a control circuit 100 for controlling the electric motor 54 in response to a vehicle command signal obtained by user activation of "4×4/4×2" selector switch 102. The ignition switch 104 provides electric current from battery 106 to the control circuit 100. When the ignition switch 104 is closed, electric current is supplied to an encoder/wiper module 108. The encoder/wiper module 108 includes a "4×4 shift" contact 110 and a "4×2 shift" contact 112. The encoder module 108 also provides current to a "4×4 light" contact 114 for activating a "4×4" indicator light 116 for indicating to the driver when the vehicle is in four wheel drive mode. The "4×4 shift," "4×2 shift," and "4×4 indicator" contacts 110, 112, 114 are all disposed on the encoder/wiper switch mechanism 120 disposed below the worm gear 72, as best illustrated in FIG. 4. The encoder/wiper switch mechanism 120, including contacts 110, 112, 114, selectively engages corresponding electric traces 122 (best shown in FIG. 5) disposed on the printed circuit board 124. Traces 122a, 122b, 122c correspond respectively to contacts 110, 112, 114 of encoder/wiper switch mechanism 120.

The control circuit 100 also includes a signal relay switch 126 which communicates between "4×4 shift" contact 110, "4×2 shift" contact 112 and a power relay coil 128. A power relay switch 130 is associated with the power relay coil 128 and is in communication with the motor 54. A signal relay coil 132 is associated with the signal relay switch 126. The circuit 100 includes a 5 pin connector 134 (mounted to the housing 52) for making connection between the control circuit 100 and battery 106, 4×4 light 116 and control module 102. The control circuit 100 can also include a resettable fuse 136 in order to prevent overload of the circuit 100.

In operation, the signal relay coil 132 is energized by a 4×4 signal from the vehicle control module 102. The energized signal relay coil 132 causes the normally open contact of signal relay switch 126 to close and supply power to the power relay coil 128 through the encoder-wiper "4×4 shift" contact 110 engaging trace 122a. Consequently, the normally open contact of power relay switch 130 is closed, so it can supply power to the motor 54. The motor 54 stays energized until the encoder/wiper "4×4 shift" contact 110 with trace 122a is opened at 180-degree rotation of worm gear 72. Therefore, upon completion of 180 degree rotation to the 4×4 position, the power relay coil 128 is de-energized and its normally closed power relay switch 130 provides a ground potential to the motor 54. This applies an effective dynamic braking for the motor 54 that prevents motor coasting.

At the "4×4" position, the encoder/wiper "4×4 light" contact 114 is closed by contact with trace 122c to provide current to the 4×4 indicator light 116, and the 4×2 shift contact 112 with trace 122b is closed to set the cycle ready for the next shift from 4×4 to 4×2.

For shifting from 4×4 mode to 4×2 mode, the actuator's signal relay coil 132 is de-energized by the 4×4 signal from the vehicle control module 102. This causes the normally closed contact of signal relay switch 126 to supply power to the power relay coil 128 through the encoder/wiper 4×2 shift contact 112 with trace 122b. Consequently, the normally open contact of power relay switch 130 is closed, so it can supply power to the motor 54. The motor 54 stays energized until the encoder/wiper "4×2 shift" contact 112 with trace 122b is opened at 180-degree rotation to the 4×2 position, the power relay coil 128 is de-energized and its normally closed contact of power relay switch 130 provides a ground potential to the motor 54. This applies an effective dynamic braking for motor 54 that prevents undesirable motor coasting.

At the 4×2 position, the encoder/wiper "4×4 indicator" contact 114 with trace 122b is opened to provide 4×2 status to the vehicle (i.e., the 4×4 light is no longer illuminated), and the 4×4 shift contact 110 with trace 122a is closed to set the cycle ready for the next shift from 4×2 mode to 4×4 mode.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A driveline disconnect, comprising:
    a first rotatable member;
    a second rotatable member;
    a coupler device operably engageable and disengageable for providing connection between said first and second rotatable members;
    a one-way electric motor mounted to an elongated housing;
    a gear mechanism operatively driven by said electric motor;
    a cam mechanism operatively driven by said gear mechanism;
    a cam follower engaged with said cam mechanism, said cam follower being supported for linear motion relative to said cam mechanism; and
    a plunger coupled to a linkage engaged by said cam follower, said plunger and said linkage moving axially with said cam follower, wherein said cam follower is disposed along an axis of said plunger, said plunger having an end portion moving axially outward relative to said housing.

2. The driveline disconnect according to claim 1, further comprising a controller for actuating said motor to rotate to provide rotation of said cam mechanism in 180 degree increments for providing connection and disconnection of said coupler device.

3. The driveline disconnect according to claim 1, wherein said elongated housing supports said electric motor, said gear mechanism, said cam mechanism and said cam follower.

4. The driveline disconnect according to claim 3, further comprising a cover connected to said housing.

5. The driveline disconnect according to claim 3, wherein said cam mechanism is rotatably mounted to said housing.

6. The driveline disconnect according to claim 1, wherein said gear mechanism includes a drive gear mounted to an output shaft of said electric motor and meshingly engaged with a driven gear.

7. The driveline disconnect according to claim 6, wherein said driven gear is connected to a worm that is in meshing engagement with a worm gear.

8. The driveline disconnect according to claim 7, wherein said worm gear is connected to said cam mechanism.

9. The driveline disconnect according to claim 8, wherein said worm gear and said cam mechanism are rotatable about a common axis.

10. The driveline disconnect according to claim 6, wherein said drive gear is smaller than said driven gear.

11. The driveline disconnect according to claim 1, wherein said first rotatable member is a drive axle and said second rotatable member is connected to a component of a differential drive mechanism.

12. The driveline disconnect according to claim 3, further comprising an electrical connector integrated with the housing.

13. The driveline disconnect according to claim 3, further comprising a circuit disposed on said housing for encoding and power control of said motor.

14. The driveline disconnect according to claim 1, further comprising a control circuit for providing dynamic braking of said motor.

15. A center axle disconnect, comprising:
    a drive axle member;
    a differential system;
    a coupler device operable between a coupled position and an uncoupled position for coupling and uncoupling said drive axle member to a component of said differential system;

a one-way electric motor;

a pear mechanism operatively driven by said electric motor;

a cam mechanism operatively driven by said gear mechanism, wherein said cam mechanism is fixedly mounted to said pear mechanism;

a cam follower engaged with said cam mechanism, said cam follower being supported for linear motion relative to said cam mechanisms;

a linkage engaged with said cam follower, said linkage including a slot portion slidably receiving a spindle of said cam follower;

a plunger coupled to said linkage, said plunger and said linkage moving axially with said cam follower, wherein said plunger is engageable to said coupler device for operation between said coupled position and said uncoupled position; and a spring of said linkage engaging said plunger and applying a biasing force to said plunger to engage said coupling device.

16. The center axle disconnect according to claim 15, further comprising a controller for energizing said motor to rotate to provide rotation of said cam mechanism in 180 degree increments for moving said coupler device between said coupled position and said uncoupled position.

17. The center axle disconnect according to claim 15, further comprising a housing supporting said electric motor, said cam mechanism and said cam follower and a cover connected to said housing.

18. The center axle disconnect according to claim 17, wherein said cam mechanism is rotatably mounted to said housing.

19. The center axle disconnect according to claim 18, further comprising a rotatable wiper switch disposed on said cam mechanism.

20. The center axle disconnect according to claim 15, further comprising a drive gear mounted to an output shaft of said electric motor and meshingly engaged with a driven gear.

21. The center axle disconnect according to claim 20, wherein said driven gear is connected to a worm that is in meshing engagement with a worm gear.

22. The center axle disconnect according to claim 21, wherein said worm gear is connected to said cam mechanism.

23. The center axle disconnect according to claim 22, wherein said worm gear and said cam mechanism are rotatable about a common axis.

24. The center axle disconnect according to claim 15 further comprising a control circuit for providing dynamic braking of said electric motor.

25. A driveline disconnect, comprising:

a first rotatable member;

a second rotatable member;

a coupler device operable between an engaged and a disengaged position for providing connection between said first and second rotatable members;

a one-way electric motor mounted to an elongated housing extending along an axis;

a drive gear mounted to said electric motor, whereby said drive gear and said motor have an angled orientation to said axis of said housing;

a worm gear mounted on said housing and rotating about a perpendicular axis to said housing axis and meshingly engaged with a worm driven by said drive gear;

a cam mechanism mounted on said worm gear and rotating about said perpendicular axis;

a cam follower axially engaged with said cam mechanism along said axis of said housing;

a linkage including a spring oriented axially to said axis of said housing, engaged with said cam follower; and a plunger oriented axially to said axis of said housing and engaged with said linkage to cause movement of a shift fork, said plunger having an end portion moving axially outward relative to said housing.

26. The driveline disconnect according to claim 25 further comprising a control circuit for providing dynamic braking of said electric motor.

* * * * *